(12) United States Patent
Kaipainen et al.

(10) Patent No.: US 9,218,748 B2
(45) Date of Patent: Dec. 22, 2015

(54) SYSTEM AND METHOD FOR PROVIDING EXERCISE IN PLAYING A MUSIC INSTRUMENT

(75) Inventors: Mikko Kaipainen, Tampere (FI); Christoph Thur, Helsinki (FI)

(73) Assignee: YOUSICIAN OY, Helsinki (FI)

( * ) Notice: Subject to any disclaimer, the term of this patent is extended or adjusted under 35 U.S.C. 154(b) by 155 days.

(21) Appl. No.: 14/113,822

(22) PCT Filed: Apr. 26, 2012

(86) PCT No.: PCT/FI2012/050415
§ 371 (c)(1),
(2), (4) Date: Oct. 25, 2013

(87) PCT Pub. No.: WO2012/146829
PCT Pub. Date: Nov. 1, 2012

(65) Prior Publication Data
US 2014/0041511 A1 Feb. 13, 2014

(30) Foreign Application Priority Data
Apr. 26, 2011 (FI) .................................. 20115401

(51) Int. Cl.
*G09B 15/06* (2006.01)
*G09B 15/02* (2006.01)
*G09B 5/06* (2006.01)

(52) U.S. Cl.
CPC ............... *G09B 15/023* (2013.01); *G09B 5/06* (2013.01)

(58) Field of Classification Search
CPC .............................. G09B 5/06; G09B 15/023
USPC .......................................................... 84/465
See application file for complete search history.

(56) References Cited

U.S. PATENT DOCUMENTS

| 7,030,307 | B2 | 4/2006 | Wedel |
| 2008/0271591 | A1 | 11/2008 | Lemons |
| 2010/0137049 | A1* | 6/2010 | Epstein .................... 463/7 |
| 2010/0313736 | A1 | 12/2010 | Lenz |

FOREIGN PATENT DOCUMENTS

| EP | 0933749 | 8/1999 |
| WO | 9317408 | 9/1993 |
| WO | 2006092098 | 9/2006 |
| WO | 2010059994 | 5/2010 |
| WO | 2010083563 | 7/2010 |
| WO | 2011030225 | 3/2011 |

OTHER PUBLICATIONS

International Search Report dated Oct. 3, 2012, corresponding to the PCT/FI2012/050415.

* cited by examiner

*Primary Examiner* — Jianchun Qin
(74) *Attorney, Agent, or Firm* — Young & Thompson

(57) ABSTRACT

A system and method for providing exercise in playing a music instrument. With prior art solutions there is a common problem of inadequate motivation of the user to continue practicing, and inadequate learning of items which are difficult for a specific user. The present solution detects characteristics of the user's play detected and uses them to provide a suitable program of exercises and to provide feedback which enhances motivation of the user.

23 Claims, 3 Drawing Sheets

SYSTEM AND METHOD FOR PROVIDING EXERCISE IN PLAYING A MUSIC INSTRUMENT

TECHNICAL FIELD OF THE INVENTION

The present invention relates to a system and a method for providing exercise in playing a music instrument. More particularly, the present invention relates to what is disclosed in the preambles of the independent claims.

BACKGROUND OF THE INVENTION

When a beginner starts to exercise playing a music instrument it is important to have high motivation. Usually, beginners have high motivation in the beginning, but since repetitive practicing of tone sequences is required and the progress in learning is usually slow, a beginner often loses the inner motivation and stops practicing. As a result, it has been estimated that 85% of people that start playing a music instrument quit before they reach a reasonable skill level.

Some methods have been developed to imitate the playing of a music instrument. For example, a "Guitar Hero®" system includes a special type guitar, which is played by pressing buttons instead of pressing strings. The system also includes software which is played in a game console. The user can select one of stored songs, after which the system shows on a display instructions for playing, i.e. the buttons to be pressed. Such a system makes playing with a special game guitar entertaining but it does not help much in learning to play a standard type guitar or other music instruments.

Patent publication U.S. Pat. No. 7,030,307B2 discloses a system where notes of a music piece are shown in a simplified, visual manner on a computer screen. The system also gives the user feedback on whether the playing was correct. However, the system requires an electronic music instrument with a digital MIDI interface. There are certain disadvantages or deficiencies in the prior art systems. Firstly, if a system has a learning program, it is usually same for all users. On the other hand, users may be able to select music pieces which they use for practicing the playing. However, people are different in what items they learn fast and what items are more difficult to learn. In a prior art system, a user may get an acceptable score even if the user has difficulties in some specific items. When a fixed exercise program or randomly selected exercises are used, a user probably does not get enough practice in such items which are difficult for the user. As a result, certain skills may remain poor despite the practice. People also tend to overestimate their current skills, which leads to selecting too difficult exercises and getting further demotivated to practice.

The prior art systems do not either enhance the motivation of the user to practice exercises. Although the systems give feedback on the user's mistakes the user is only told what the user has done wrong without proposing how to counter the current skill deficiency.

SUMMARY OF THE INVENTION

An object of the invention is to alleviate the problems and disadvantages relating to the known prior art solutions. Especially it is the object to provide a solution for learning to play a music instrument, where the system enhances the user's motivation to practice and where individual requirements for learning are perceived.

At least a part of the objects of the invention is achieved by the present inventive solution, wherein characteristics of the user's play are detected and used both for providing a suitable program of exercises and for providing feedback. This helps the user to overcome problems in learning and also enhances the motivation of the user.

System according to the invention for providing exercise in playing a music instrument, wherein the system comprises:
  means for providing playing exercise data, such as notes, intervals and chords, for a user,
  means for forming or receiving electrical signals corresponding to the acoustical sound created by the user playing according to the exercise with a music instrument,
  means for recognizing parameters of the electrical signals,
  means for comparing the parameters of the played music with the exercise data in order to obtain at least one playing characteristic,
is characterized in that the system further comprises
  means for providing instant feedback to the user on the user's playing of an exercise during the played exercise on the basis of one of the at least one playing characteristic,
  means for providing cumulative feedback to the user on the user's playing on the basis of one of the at least one playing characteristic, and
  means for selecting a further exercise on the basis of one of the at least one playing characteristic.

Method according to the invention for providing exercise in playing a music instrument, wherein:
  playing exercise data, such as notes, intervals and chords, is provided for a user,
  electrical signals are formed or received corresponding to the acoustical sound created by the user playing according to the exercise with a music instrument,
  parameters of the electrical signals are recognized,
  the parameters of the played music are compared with the exercise data in order to obtain at least one playing characteristic,
is characterized in that
  instant feedback is provided to the user on the user's playing of an exercise during the played exercise on the basis of one of the at least one playing characteristic,
  cumulative feedback is provided to the user on the user's playing on the basis of one of the at least one playing characteristic, and
  a further exercise is selected on the basis of one of the at least one playing characteristic.

Some preferable embodiments are described in dependent claims.

According to one embodiment of the invention a characteristic of a user's playing is evaluation data on separate items (note, interval, chord) of an exercise, and the evaluation data is shown to the user substantially online during the playing of the exercise. This way a user receives immediate feedback on whether the playing is correct or when and which errors exist in the user's playing.

According to one embodiment of the invention a characteristic of the user's playing is a score of points. The points may be based on the evaluation of each played exercise, the number of played exercises, the number and timing of separate rehearsals of exercises, and/or practicing with other players, for example. This way the user is able to see development in the user's score even if the skills of the user may first develop slowly. And by the development of the score the user is able to get new exercises and possibly prizes or rights to attend to certain services of the system. This way practicing exercises becomes a motivating game.

According to one embodiment of the invention there is a predetermined skill level linked with an exercise, and the user is not able to select/use the exercise until the user has passed the skill level. For example, after performing "Am-F#—easy" exercise first, the user can perform "Am-F#—medium" exercise. The exercises are thus "locked" from selection/usage, until passing the related skill level opens the locking. So, after passing skill levels, the user gets new exercises to select from. In other words, the availability of certain exercise is subject to achievements previously in the game either through other exercises, or other, general tasks within the game. This way the user does not select exercises which would be too difficult for the user. And it is also possible to ensure that the user will learn all items in a suitable order.

According to one embodiment of the invention the feedback includes specific tips for the user to overcome the problems related to the errors the user has made in playing.

According to another embodiment of the invention a characteristic of the user's play includes information on exercise items where the user has shown good skills and/or exercise items in which the user has managed worse. This information can be used for selecting following exercises in the user's learning program. The exercises preferably include information on the exercise character of each exercise, informing which items the exercise includes and what items are best learnt with the exercise. When the system finds out that a certain item is difficult for a user it may thus select for the user such an exercise where this item is weighted and does not pass the user to next skill level unless this item has been properly learnt.

It is also possible to use characteristic of other users' playing for selecting the next exercise. The system may learn from the experience of users, and when a certain exercise is found to help learning a certain item, this information can then included in exercise character data and be used for selecting exercises for other users with similar needs. The system is thus able to gather data from each user's skills and advancements, and is therefore able to give helpful tips and adapt the learning plan according to the user's preferences and needs. This feature is made available by collecting and analyzing the performances of all users. Therefore, the system will be able to evaluate what type of learner the user is. The exercise plan can then be adapted to include exercises that have been helpful to users with similar learning patterns.

It is further possible to provide and use a statistic model of users. Data is collected relating to e.g. typical errors of users and efficiency of various exercises to get the errors corrected. Based on collected data a parametric statistic model is created of users, which model may include the users' skills in different sectors, difficulties in learning etc., as well as a model is created of how exercises affect the development of a user. Players can be clustered into groups based on their common characteristics, whereby members i each group have common characteristics, such as a similar skill profile etc. A new user may first be a member in a "global group", but the user can be later classified based on the user's performance. Based on such a "user class" it is possible to provide predictions on how efficient certain exercises are for a certain user.

According to one embodiment of the invention a visual game is used for enhancing motivation of a user. In this embodiment the practicing of an exercise affects the outcome in the game. For example, playing the notes/intervals/chords in a correct manner will allow the player to advance in the game, whereas errors in the playing may affect adversely in the game. Instead or in addition to showing score as points to a user, it is possible to give corresponding feedback to a user by achievements in a game. Such a manner of illustrating scores is often more motivating especially for young users.

It is possible to implement the invention in a single computer. However, according to a preferable embodiment, the inventive system includes a server which can be connected via a communication network, such as the Internet. The server may include a database of exercises, games etc., which can be downloaded to the computers of the users. It is also possible that services have browser based usage whereby games, for example, need not be installed in a user computer. The server database may also include the information of the users including their identification information, scores of points, other characteristics of the user etc.

According to one embodiment the server has a functionality which allows users to compete with each other. This can be based on scores of the players, or in may be based on playing a specific piece of music, whereby the server evaluates the characteristics of the users' play and gives results to the players. It is also possible that test exercises are stored in the server, and by performing well in a test exercise a user may reach a higher level in skill evaluation. This may give a right to a user to use certain services of the system.

According to one embodiment of the invention the server has a functionality which allows users to play as a band. They may play simultaneously, and the server combines the playing of the band members and transfers the combined playing of the band to the members to hear it. Alternatively, it is also possible that the members of the band play their parts separately, and the server will combine the playing of the members step by step.

It is also possible to recognize a certain player on the basis of an "acoustic fingerprint" of the user's instrument. It is also possible to recognize a user on the basis of the user's way to play, even if a same instrument is used alternately by several players. Such recognition can be used, for example, in verifying that the player is the correct user in a game, practices or a band and for assigning scores and performances to correct users. The system may store user profiles including playing and learning characteristics for various purposes.

According to one embodiment of the invention the server has a functionality which allows the users to store their songs in the server and further allows other users or non-users (e.g. parents of a user) to listen and possibly download and buy them.

According to one embodiment of the invention the system has a functionality which allows the users to have a virtual career in playing music. There may be arranged competitions, concerts etc., and after reaching a defined score/skill level, the user can attend to further competitions, concerts, bands etc.

The present invention can be used for exercising most types of music instruments. The system is most advantageous for learning to play steel string acoustic guitar, nylon string acoustic guitar, electric guitar, and bass guitar. Further important instruments are piano, saxophone, flute, violin, etc. It is also possible to apply the invention for learning vocals.

The exemplary embodiments of the invention presented in this document are not to be interpreted to pose limitations to the applicability of the appended claims. The verb "to comprise" is used in this document as an open limitation that does not exclude the existence of also unrecited features. The features recited in depending claims are mutually freely combinable unless otherwise explicitly stated.

Term "exercise" is used in this patent application to mean any task which is related to learning to play a music instrument. The exercise may include playing of notes, intervals or chords, or it may include playing a piece of music. An exercise may also include cooperation with other players, such as playing as a band. An exercise may also include learning and/or answering theoretical matters which concern playing a music instrument. And further, the exercise may include general music related questions.

Term "select an exercise" is used in this patent application to mean selecting an exercise from a given set of selectable exercises or it may also mean that an exercise is created and the characteristic(s) of the created exercise are selected. The selection may further mean making a suggestion to a user of one or several suitable exercises.

Term "parameters of a signal" means preferably frequency and amplitude values of frequency components, i.e. pitch and salience, but it may also mean timing, duration, volume or style of playing, for example. Parameters may further include melody, harmony, rhythm, tempo, meter, articulation, dynamics and the sonic qualities of timbre and texture.

Term "characteristic of playing" is used in this patent application to mean e.g. differences in playing a music item compared to exercise data and/or score of points of a player and/or a skill of a user to play certain musical items. The characteristic of playing may also mean frequency and time periods of practising, or playing with other users.

Term "score" is used in this patent application to mean a measure which is related e.g. to user's amount and success of practicing exercises and acquired skill level. The score may be illustrated as points or levels, but it may also be in other forms, such as prizes, or achievements in a visual game.

Term "characteristic of an exercise" is used in this patent application to mean e.g. the level of difficulty, musical items included in the exercise and/or information on suitability of the exercise for learning certain musical items.

Term "exercise data" is used in this patent application to mean data which is displayed for the user, such as notes, intervals or chords, according to which the player plays the exercise. However, the exercise data given to a more experienced user may be a name of a song in minimum. Exercise data is also used for comparing with the played signal in order to evaluate the playing of the user.

Term "server" is used in this patent application to mean a computer which is can be accessed via a communication network and which can provide services to other computers via the network. The server functionalities can be located in a single server or they can be distributed to several servers, such as a cloud computing service. It is also possible that a computer or a game console of a user provides server functionalities to users.

BRIEF DESCRIPTION OF THE DRAWINGS

Next the invention will be described in greater detail with reference to exemplary embodiments in accordance with the accompanying drawings, in which.

DETAILED DESCRIPTION

Figure 1:
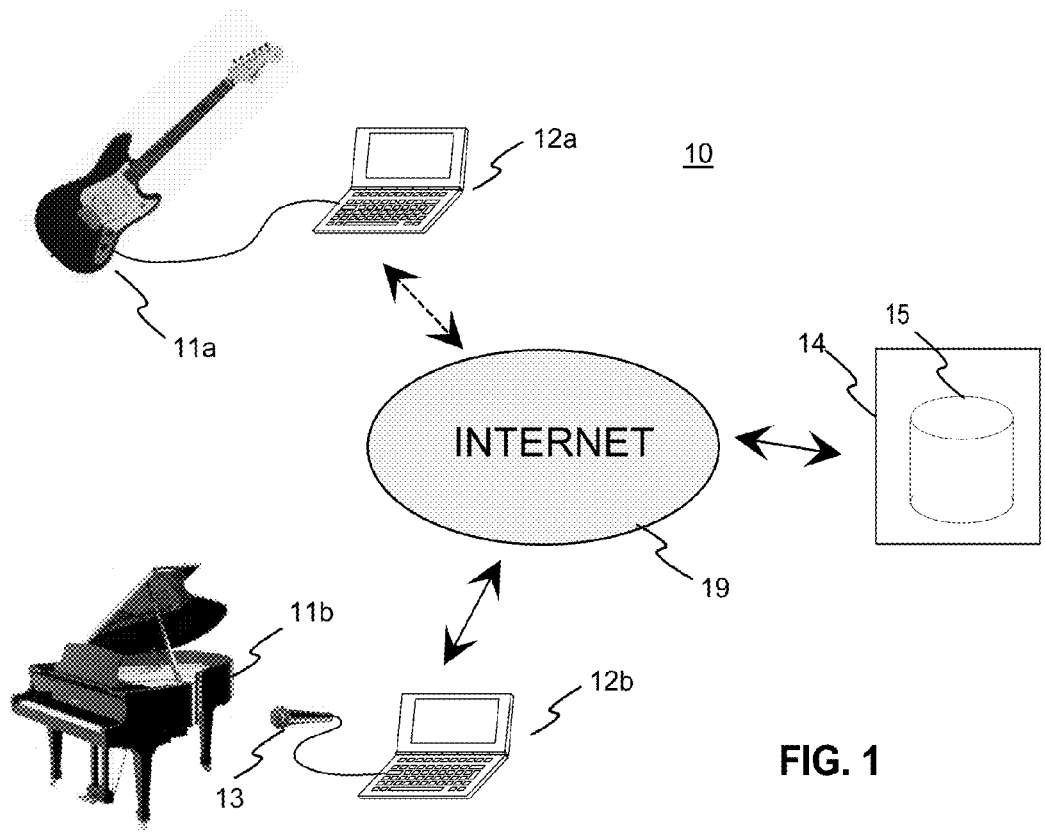
FIG. 1 illustrates a block diagram of an exemplary system according to the invention.

FIG. 1 illustrates a general block diagram of an exemplary system according to the invention. The Figure shows music instruments 11a and 11b of two users. The users have computer devices 12a and 12b respectively. The music instrument 11a is an electric guitar with an inbuilt microphone (not shown). The signal from the microphone is connected to the microphone input of the laptop computer 12a. It is also possible that there is an audio amplifier between the guitar microphone and the computer device.

The music instrument 11b of another user is a conventional, non-electric piano. The system includes a microphone 13 for receiving the acoustic sound and converting it into an electric signal. The electric audio signal is then led to an input of the laptop computer 12b. It is naturally also possible that an internal microphone of a computer or a smart phone is used.

The user devices 12a and 12b, such as computers, preferably have a network connection to Internet 19, for example. Alternatively, the network may be a local network if there is large number of users in a facility, such as pupils in a school. The system preferably has at least one server, which is connected to the network. The user devices can thus communicate with a system server 14. However, it is also possible to implement the invention in a stand alone device, such as a computer 12a, without using a network connection or a server.

The system server 14 includes a database 15 including user register, loadable data and information related to social services. The server may offer several types of services for the users, such as a library of exercises/music pieces which can be downloaded by the users. The server may include functionality to arrange competitions and virtual concerts, and it can create and maintain score levels of the users, and administer the rights of the users to attend to various services.

It is possible that the user devices 12a and 12b include required hardware and software for providing exercises to a user and providing feedback to the user. In such a case the network connection to the server is required mainly for downloading new exercises/music pieces and other updates as well as for taking part in social functions. Alternatively, it is also possible that also the basic exercise program is located in the server, whereby the network connection to the server is needed also in practicing the exercises, but it is not necessary to have high computing capacity/speed in the user device. It is also possible to use combinations of these two alternatives.

Figure 2:
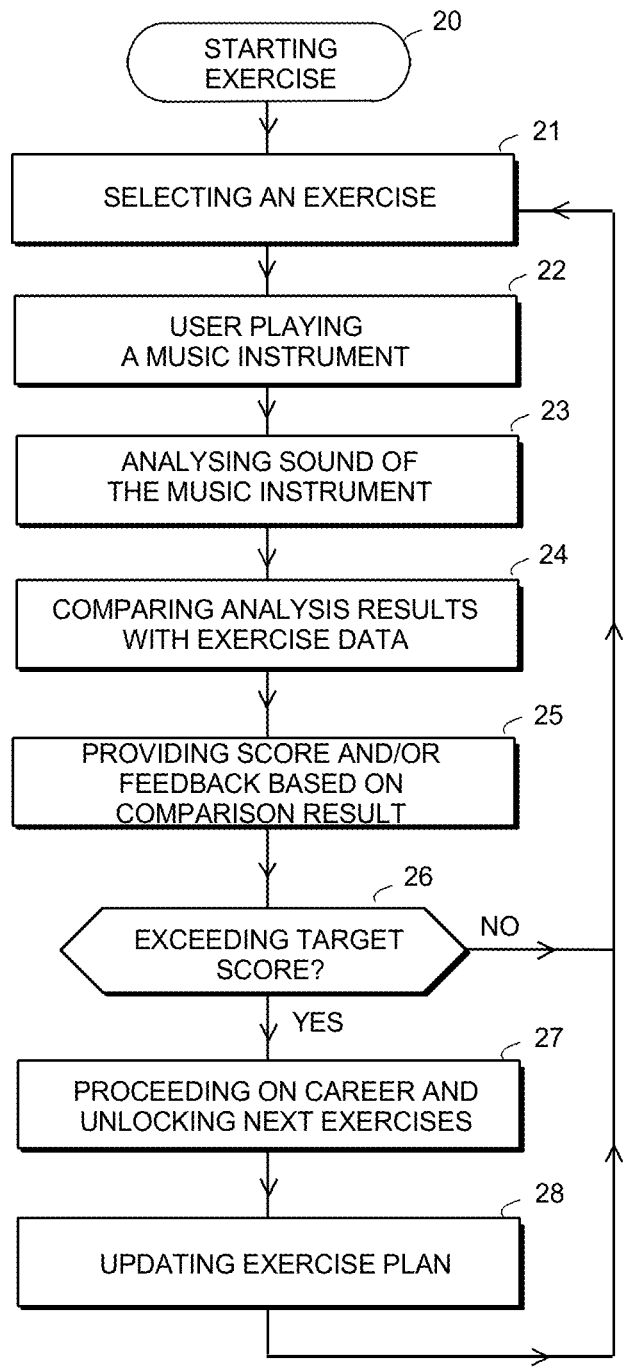
FIG. 2 illustrates a flow diagram according to an exemplary method according to the invention.

FIG. 2 illustrates a general flow diagram of an exemplary method according to the invention. At the beginning, 20, an exercise is selected in phase 21. The exercise may be selected from a group of exercises which are made available by the system. The user can select himself, the system may suggest, or the user can indicate some direction (e.g. classical guitar) to which the system will develop a suitable rehearsal plan. When an exercise has been selected the system starts showing exercise data, such as notes, intervals and chords, on a display of a user device. The user then plays a music instrument, 22, according to the displayed exercise data.

The acoustic sound of the music instrument is received by a microphone of the system, and analysed in the system, phase 23. The analysis can be made in a user device or a server of the system. In the analysis, the electric audio signal is converted into frequency components and/or other parameters, and compared with the exercise data, 24, to achieve characteristics of the user's playing.

The system may provide instant feedback to the user on each played note/interval/chord, 25. The user may thus find out immediately possible errors in the playing and is able to learn from this information. The feedback can be provided during the playing in different alternative ways. The feedback may include visualization, e.g. in a form of a game. It may include audio, such as different sounds for different achieved scores. The feedback may also be semi-visual where e.g. a whole display screen flashes for a moment in some colour, pattern of image. A user is able to register such a feedback without actually watching the screen. One possibility to provide feedback is adaptation of background song; if the user plays well background is nice, but if not, background becomes less pleasant. A further possibility is to adapt the speed of an exercise; the speed may slow down or even stop until the correct note/interval/chord has been played.

It is also possible that the obtained characteristics include a cumulative score of points, for example, based on the present exercise or longer exercise history. Such a score of points may also be based on the practicing activity periods. Also interactivity with other players, such as playing in a band, may increase the score. Further, it is possible that there is a test exercise which is common to many users, whereby it is possible to determine a skill level as a playing characteristic, which is comparable between different users.

After the exercise is played, the system will check whether a target score has been exceeded, 26. If target score has not been exceeded the system/user will select a new exercise from the same group of exercises, 21. If the target score is exceeded in phase 26, the user will enter a next step on the musician career. The user may thus get access to further services of the system, such as taking part in music competitions or concerts. Such services are provided by a server of the system, and the services allow several users of a given skill or score level to take part. On the other hand, the system offers real life services which do not require a server and which support the real development of the user's skills.

When a target score is exceeded the system may also update the exercise progression that is available for the user. Unlocking new exercises may be based on the characteristics of the user's playing as well as characteristics of the exercises. This way the system will find which items require more practicing and which items require less practising. Considering this information together with the characteristics of the exercises, optimal exercises can be selected for the individual user in an updated exercise plan, 28. When the exercises have been selected the user may download them from the server to the user device, for example. It should be noted that the selection of next exercises can be done even if a target score is not exceeded, even after each exercise. The next exercise is then selected from a group of unlocked exercises, 21.

Individual song exercises can be created for a user in a following exemplary way. The system first defines the tasks, e.g. which chords, notes, intervals have to be played in what order and what timing. Then a suitable background track (audio) and background level (visualization) is specifically designed/composed for the program. This means a difference to traditional music teaching, where there is a trade off between a nice song a user wants to play vs. a song with as suitable as possible difficulty level and techniques required. The invention makes it possible that a needed skill is assessed or predefined, and suitable exercises are developed to help the user to precisely develop this particular skill.

The exercises of an exercise library can be assorted according to instrument and level of difficulty, and the exercises may also include pieces of real performances of songs. These files may include the complete song as audio file, but also separated tracks of all music instruments separately, one for guitar, one for piano, one for the voice, and so on. Those separate tracks can be available to the user, and the user may thus replace one track with user's own performance.

Figure 3:
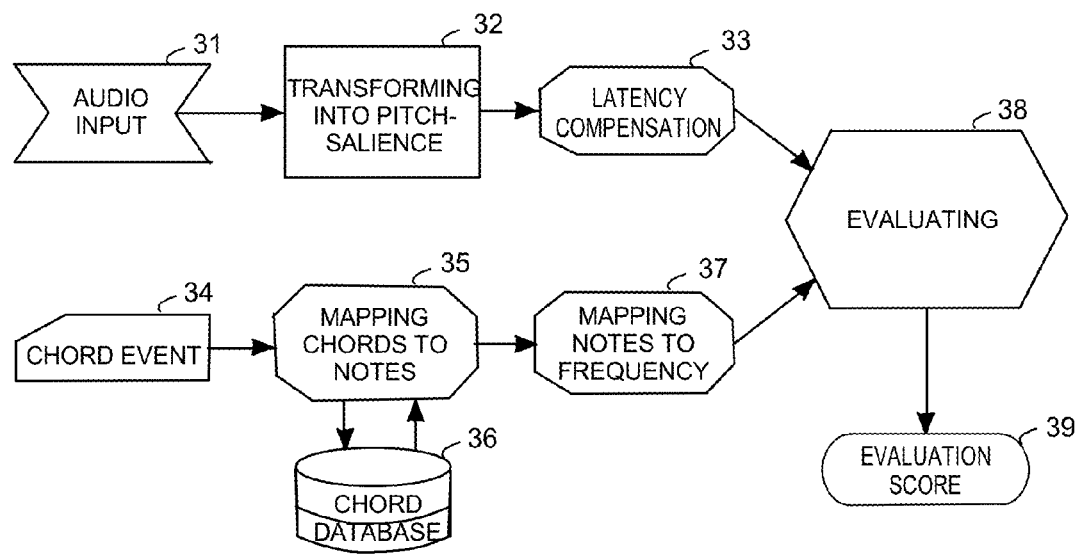
FIG. 3 illustrates a functional diagram of exemplary playing evaluation based on polyphonic signal recognition.

FIG. 3 illustrates a functional diagram of an exemplary method for analysing the playing of a user. The system receives an audio signal input from a microphone 31 or some other input. The signal is then converted into parameter data, 32. This data shows e.g. information on the frequency components of the signal and their amplitudes, i.e. pitch and salience, and it may also include information on timing, volume, duration, style of playing (like staccato) or up vs. down strumming in guitar. Further, parameter data may include melody, harmony, rhythm, tempo, meter, articulation, dynamics and the sonic qualities of timbre and texture. While the signal may include such many different types of parameters, FIG. 3 illustrates an example where signal frequency is a parameter. However, the other types of parameters, such as ones listed above, can naturally be processed in a corresponding manner.

The input signal may also be a digital signal received from the music instrument, e.g. from a MIDI interface of the instrument. In such a case the required signal parameters can be achieved from the digital signal directly or with digital processing.

Note/interval/chord events are received from the exercise data, 34. The interval and chord data is mapped into notes, 35, based on conversion information on a database 36. The notes are further mapped into frequencies, 37. Before the evaluation the latency of the signals is compensated, 33. The system uses the information on which are the correct frequency components and sums weighed amplitude values of these frequency components of the played signal, 38. The result is scaled and a point score is achieved, 39.

It is possible that the exercise data includes other parameters in addition to frequency and amplitude values of frequency components i.e. pitch and salience, such as timing, duration, volume or style of playing, melody, harmony, rhythm, tempo, meter, articulation, dynamics and the sonic qualities of timbre and texture. Such parameters can then also be compared to the audio signal parameters of playing and achieve further characteristics of the playing. If the exercise data in the form of MIDI exercise files, the file may contains basic note information (note on and note off messages) which can be mapped into frequencies. A MIDI exercise file may also include also other exercise parameters such as timing of notes, intervals, and/or chords as well as other parameters described above.

The described analysis method allows analysing intervals and chords, i.e. several simultaneous notes. One possible analysis method is described in more detail in a publication [A. Klapuri. *Multiple fundamental frequency estimation by summing harmonic amplitudes*. Proc. ISMIR 2006]. However, other alternative analysis methods may also be used such as pattern matching method, for example.

The techniques for recognizing notes from an acoustic signal can be self learning based on collected audio data. Such audio data can be specifically provided to the system, but such data can also be collected from the playing of the users. The acoustic data recorded from the users as well as other collected data can be thus used for optimizing the system and for detecting error situations.

Figure 4:
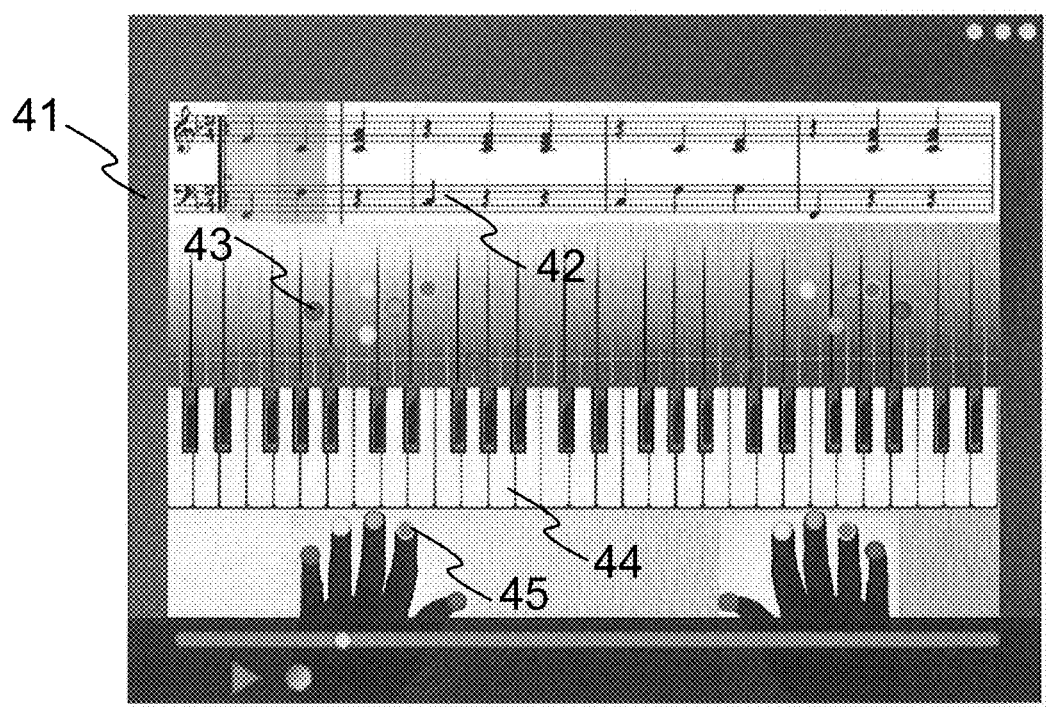
FIG. 4 illustrates a user interface for playing a piano in an exemplary system according to the invention.

FIG. 4 illustrates a display 41 of a user device, such as a laptop, tablet or desktop computer, or a smartphone, for example. The display shows an exemplary user interface according to the invention for practising the playing of piano. At the top area 42 of the display notes, intervals and chords are shown which a user must play in practising an exercise. The notes move to the left as the piece of music proceeds. The display also includes marks 43 which show the keys to be played at a virtual keyboard 44. The marks drop down as the piece of music proceeds. The display also shows which fingers are used, 45.

Figure 5:
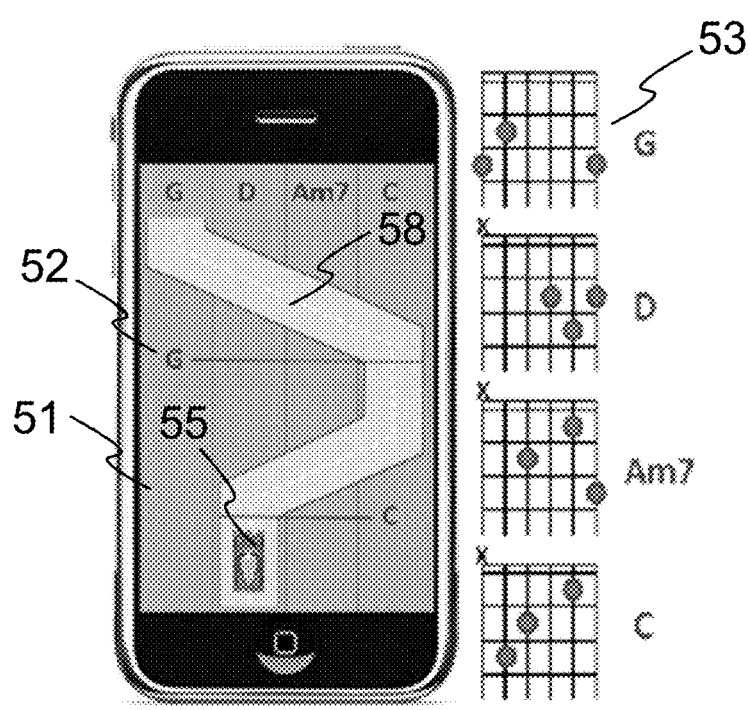
FIG. 5 illustrates a user interface with a visual game of another exemplary system according to the invention.

FIG. 5 illustrates an embodiment of the invention where visual game is used for showing exercise data to a user as well as feedback on the playing. On a display 51 of a mobile phone there are marked notes/intervals/chords which user has to play. It is also possible that the notes/intervals/chords are shown on a fretboard 53 of a guitar, for example, especially if a larger display is used. The display also shows a car 55, which should be kept on the road 58. If the user plays a music item correctly the car will follow the road. If the user makes an error the car does not move. When the user succeeds in playing with at least a predetermined quality level the user reaches the finish line with the car, which here corresponds to a success score.

In this patent specification the structure of the various components of the system and devices is not described in more detail as they can be implemented using the description above and the general knowledge of a person skilled in the art.

It should be noted that the functioning of the system requires suitable computer program products, which are run in computers/servers/game consoles or other devices. The control of functions in the devices generally takes place in an arrangement of processing capacity in the form of microprocessor(s) and memory in the form of memory circuits. To convert a known device or system into equipment according to the invention it is necessary, in addition to the hardware modifications, to store into the memory means a set of machine-readable instructions that instruct the microprocessor(s) to perform the operations described above. Composing and storing into memory of such instructions involves known technology which, when combined with the teachings of this patent application, is within the capabilities of a person skilled in the art.

The scope of the patent will be defined by the appended claims. Skilled persons will appreciate the fact that various changes and modifications may be made to the explicitly disclosed embodiments and features thereof without diverging from the scope as set forth in the claims.

For example, the user device of the system is preferably a personal computer, but it may also be a game console, a television set or some other device which is capable of providing the described functionalities. It is also possible that the processing and storage functions are distributed between a user device and a server in various ways.

The invention claimed is:

1. A system for providing an exercise to a user in playing a music instrument, the system comprising:
a database containing converting information;
a device that provides i) a music playing exercise to the user in a form of a first ensemble of notes, intervals and chords displayed on a display of the device, the music playing exercise being based on music playing exercise data of events comprised of the notes, the intervals and the chords, and ii) feedback to the user when, responsive to the displayed first ensemble, the user plays the music instrument and creates an acoustical sound;
means for i) mapping the events of the music playing exercise data, to mapped notes in accordance with the converting information in the database, the mapped notes having frequency components, and ii) further mapping the mapped notes to the frequency components of the mapped notes, said mapping defining a first ensemble of said mapped frequency components;
a microphone that i) receives the acoustical sound created by the user and ii) forms electrical signals of a second ensemble of the notes, the intervals and the chords corresponding to the acoustical sound created by the user;
means for transforming the electrical signals of the second ensemble formed by the microphone into transformed frequency components defining a second ensemble of said transformed frequency components;
means for recognizing parameters of the electrical signals, from the transformed frequency components, wherein said means for recognizing parameters are arranged to recognize as the parameters of the electrical signals:
i) at least one of the group consisting of a) a frequency value of a frequency component, and b) an amplitude value of each frequency component, and
ii) at least one of the group consisting of a) timing of play for each said frequency component, b) duration of play for each said frequency component, and c) frequency components from a note of a corresponding ensemble or sub-ensemble of transformed frequency components and amplitudes of the ensemble or sub-ensemble of transformed frequency components,
said means for recognizing parameters, for recognition of at least one of a melody and a rhythm, recognizing the frequency value of frequency components, the duration and timing in respect to other frequency components,
said means for recognizing parameters, for recognition of tempo of the playing, recognizing intermediate timing of the notes, the intervals and the chords;
means for comparing the second ensemble of said transformed frequency components to the first ensemble of said mapped frequency components to obtain at least one parameter of at least one playing characteristic;
a configuration of the system defining a skill level of the user according to the at least one parameter of the one playing characteristic, wherein the system is configured to train the user's playing in accordance of the at least one playing characteristic;
means for providing instant feedback to the user on the user's playing of the exercise during the played exercise on the basis of the at least one playing characteristic;
means for providing cumulative feedback to the user on the user's playing on the basis of the at least one playing characteristic;
means for selecting a further exercise on the basis of the at least one playing characteristic; and
means for gathering data from plural users' skills and advancements for collecting and analyzing performance of the plural users and experiences of the plural user, in order to find a weighted exercise to help a certain user in a certain item in said certain user's learning, and adapting an exercise plan of the certain user via seeking from the users' experiences in accordance to said certain user's skills to find, in the database, similar users' learning patterns similar to the certain user.

2. The system according to claim 1, wherein a first playing characteristic includes information on how a single note, interval or a chord was played compared to the music playing exercise data and said feedback to the user on the user's playing an exercise during the played exercise is based on the first playing characteristic.

3. The system according to claim 1, wherein a second playing characteristic is a score, which includes information on playing of several exercise instances and said cumulative feedback to the user on the user's playing is based on the second playing characteristic.

4. The system according to claim 1, wherein a third playing characteristic includes information on at least one of i) the user's playing of certain exercise items and ii) other users' playing of certain exercise items, and said selecting a further exercise is based on the third playing characteristic.

5. The system according to claim 4, wherein exercises have defined characteristics, and said selecting a further exercise is also based on the exercise characteristics.

6. The system according to claim 1, wherein the signal is a polyphonic signal, and the system is arranged to recognize at least two simultaneous fundamental frequency components corresponding to different notes.

7. The system according to claim 1, wherein the system comprises a server, which has an interface for an access from terminals of multiple users through a network.

8. The system according to claim 1, wherein the system comprises means for storing the notes, the intervals, and the chords of a piece of music, and means for converting the notes, the intervals, and the chords into frequency data, which serves as the exercise data of the piece of music.

9. The system according to claim 1, wherein the system comprises means for providing a skill level for a user on the basis of the comparison results of predetermined exercise(s), which is common to several users.

10. The system according to claim 1, wherein the system comprises means for storing score and skill level of users and means for providing user access to determined services, functions and events provided by the system on the basis of a score or a skill level of a user.

11. The system according to claim 1, wherein the system comprises means for linking exercises with predetermined skill or score levels, and the system is arranged to keep an exercise prevented from usage of a user until the user reaches the predetermined skill or score level, which is then arranged to release the locking, allowing the user to select the exercise for usage.

12. A method for providing an exercise to a user playing a music instrument, the method comprising:
with a device that provides i) a music playing exercise to the user, the music playing exercise being based on music playing exercise data of events comprised of notes, intervals and chords, and ii) feedback to the user, providing the user with the music playing exercise data in a form of a first ensemble of the notes, the intervals and the chords displayed a display of the device;
in accordance with converting information in a data base, i) mapping of the events into mapped notes, and then ii) further mapping the mapped notes into frequency components to thereby identify frequency components of the mapped notes, said mapping defining a first ensemble of said mapped frequency components;
in response to the user creating an acoustical sound by playing the music playing exercise on the music instrument, receiving and forming into electrical signals a second ensemble of the notes, the intervals and the chords corresponding to the acoustical sound created by the user;
transforming the electrical signals to transformed frequency components defining a second ensemble of said transformed frequency components;
using a recognizing device, recognizing parameters of the electrical signals, from the transformed frequency components, wherein the recognized parameters include:
i) at least one of the group consisting of a) a frequency value of a frequency component, and b) an amplitude value of each frequency component, and
ii) at least one of the group consisting of a) timing of play for each said frequency component, b) duration of play for each said frequency component, and c) frequency components from a note corresponding ensemble/sub-ensemble of transformed frequency components and their amplitudes/strengths, wherein,
for recognition of at least one of a melody and a rhythm, recognizing the frequency value of frequency components, the duration and timing in respect to other frequency components, and
for recognition of tempo of the playing, recognizing intermediate timing of the notes, the intervals and the chords;
comparing the second ensemble of said transformed frequency components to the first ensemble of said mapped frequency components to obtain at least one parameter of at least one playing characteristic;
providing, as a configuration of the system, a skill level of the user according to the at least one parameter of the at least one playing characteristic, wherein the system is configured to train the user's playing in accordance of the at least one playing characteristic;
providing instant feedback to the user on the user's playing of an exercise during the played exercise on the basis of the at least one playing characteristic;
providing cumulative feedback to the user on the user's playing on the basis of the at least one playing characteristic;
selecting a further exercise on the basis of the at least one playing characteristic; and
gathering data by means for gathering data from plural users' skills and advancements for collecting and analyzing the performance of the plural users and experiences of the plural users, in order to find a weighted exercise to help a certain user in a certain item in said certain user's learning, and by adapting the exercise plan of the certain user via seeking from the users' experiences in accordance to said certain user's skills to find similar users' learning patterns similar to the certain user in the database.

13. The method according to claim 12, wherein a first playing characteristic includes information on how a single note, interval or a chord was played compared to the exercise data and said feedback to the user on the user's playing an exercise during the played exercise is based on the first playing characteristic.

14. The method according to claim 12, wherein a second playing characteristic is a score, which includes information on playing of several exercise instances and said cumulative feedback to the user on the user's playing is based on the second playing characteristic.

15. The method according to claim 12, wherein a third playing characteristic includes information on at least one of i) the user's playing of certain exercise items and ii) other users' playing of certain exercise items and said selecting a further exercise is based on the third playing characteristic.

16. The method according to claim 15, wherein exercises have defined characteristics, and said selecting a further exercise is also based on the exercise characteristics.

17. The method according to claim 12, wherein the signal is a polyphonic signal, and at least two simultaneous fundamental frequency components corresponding to different notes are recognized.

18. The method according to claim 12, wherein the notes, the intervals, and the chords of a piece of music are stored, and the notes, the intervals, and the chords are converted into frequency data, which is compared with frequency data of the signal from the user's playing.

19. The method according to claim 12, wherein a skill level is provided for a user on the basis of the comparison results of predetermined exercise(s), which is common to several users.

20. The method according to claim 12, wherein at least the score or skill level of users is stored end user access is provided to determined services, functions or events on the basis of the score or the skill level of a user.

21. The method according to claim 12, wherein the parameters include at least one of the following: frequency and amplitude values of frequency components including pitch and salience, timing, duration, volume or style of playing, melody, harmony, rhythm, tempo, meter, articulation, dynamics and the sonic qualities of timbre and texture.

22. A non-transitory commuter readable medium containing software code readable by a computer and executable in a processor, wherein the code is arranged to implement the method according to claim 12.

23. A system for providing an exercise to a user in playing a music instrument, the system comprising:
- a database containing converting information;
- a device that provides i) a music playing exercise to the user in a form of a first ensemble of notes, intervals and chords displayed on a display of the device, the music playing exercise being based on music playing exercise data of events comprised of the notes, the intervals and the chords, and ii) feedback to the user when, responsive to the displayed first ensemble, the user plays the music instrument and creates an acoustical sound;
- means for i) mapping the events of the music playing exercise data, to mapped notes in accordance with the converting information in the database, the mapped notes having frequency components, and ii) further mapping the mapped notes to the frequency components of the mapped notes, said mapping defining a first ensemble of said mapped frequency components;
- a microphone that i) receives the acoustical sound created by the user and ii) forms electrical signals of a second ensemble of notes, intervals and chords corresponding to the acoustical sound created by the user;
- means for transforming the electrical signals of the second ensemble formed by the microphone into transformed frequency components defining a second ensemble of said transformed frequency components;
- means for recognizing parameters of the electrical signals, from the transformed frequency components, wherein said means for recognizing parameters are arranged to recognize as the parameters of the electrical signals:
  i) at least one of the group consisting of a) a frequency value of a frequency component, and b) an amplitude value of each frequency component, and
  ii) at least one of the group consisting of a) timing of play for each said frequency component, b) duration of play for each said frequency component, and c) frequency components from a note corresponding ensemble or sub-ensemble of transformed frequency components and amplitudes of the ensemble or sub-ensemble of transformed frequency components,
- means for comparing the second ensemble of said transformed frequency components to the first ensemble of said mapped frequency components to obtain a parameter of a playing characteristic;
- means for providing instant feedback to the user on the basis of the playing characteristic;
- means for providing cumulative feedback to the user on the basis of the playing characteristic;
- means for selecting a further exercise on the basis of the playing characteristic; and
- means for gathering data of plural users' in a certain skill, using said gathered data to find a weighted exercise to help a certain user in the certain skill, and adapting an exercise plan of the certain user, based on the weighted exercise in order to help the certain user improve in the certain skill.

* * * * *